(No Model.)
E. ELLIOTT.
HARNESS HOOK.
No. 399,392.　　　　　　　Patented Mar. 12, 1889.
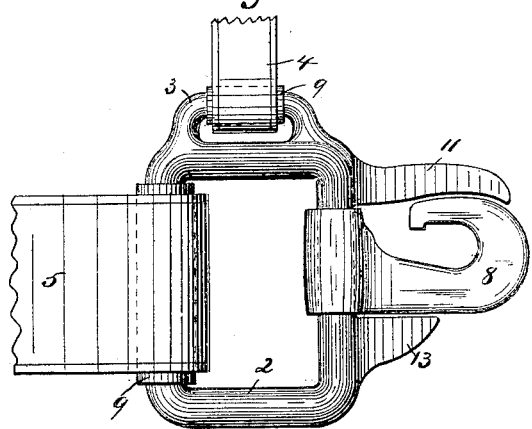
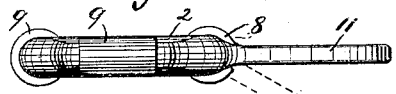
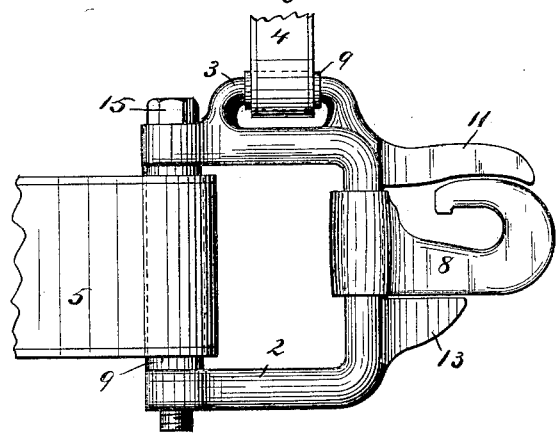
Witnesses.
J. Jessen
C. L. Nachtrieb
Inventor.
Edward Elliott.
By Paul, Sanford & Merwin Att'ys

UNITED STATES PATENT OFFICE.

EDWARD ELLIOTT, OF STILLWATER, MINNESOTA, ASSIGNOR OF ONE-HALF TO JAMES P. FITZGERALD, OF SAME PLACE.

HARNESS-HOOK.

SPECIFICATION forming part of Letters Patent No. 399,392, dated March 12, 1889.

Application filed August 7, 1888. Serial No. 282,160. (No model.)

*To all whom it may concern:*

Be it known that I, EDWARD ELLIOTT, of Stillwater, county of Washington, and State of Minnesota, have invented certain Improvements in Logging-Harness Hooks, of which the following is a specification.

My invention relates to improvements in tug-strap hooks, which are ordinarily used for logging purposes; and the object I have in view is to provide a hook which will be protected and will avoid entanglement with the reins or other parts of the harness, and will also prevent the accidental detachment of the chain, but which may be readily and easily operated to detach or unhook the chain when so desired.

My invention consists, generally, in the construction and arrangement hereinafter described, and particularly pointed out in the claims.

In the drawings which form a part of this specification, Figure 1 is a side elevation of a hook embodying my improvements. Fig. 2 is a top view of the same. Fig. 3 represents a modification.

In the drawings, 2 represents a ring or frame which supports the hook and by which it is attached to the harness. This frame is preferably made with a loop, 3, at the top, through which a supporting-strap, 4, may be passed. The tug-strap or trace 5 is preferably attached to the frame 2 at the front, and suitable sleeves or ferrules, 9, may be inserted between the straps and the frame at the point where the two join, in order to relieve the straps from wear. A hook, 8, is pivoted to the back vertical member of the frame 2 and is free to swing horizontally about its pivot.

A horn or projection, 11, is provided upon the frame 2 and extends backward and over the hook 8, so that when the hook is drawn back by the weight or the draft of the load it will be directly under the said horn, and the opening in the hook will be closed thereby. The upper surface of the horn is curved downward, so that any article falling upon the said horn will not be retained by it. The horn 11 not only protects the hook from releasing the chain, but prevents it from catching or engaging any article or material through which it may be drawn, and also prevents it from becoming entangled with the other parts of the harness.

A projection, 13, may be secured to the frame and project outward under the hook, if desired. The hook 8 is free to swing sidewise upon its pivot, and by this operation the opening in the hook may be carried outward and away from the horn, as shown in dotted lines in Fig. 2, in order that the draft-chain may be attached or released from the hook. The hook can be readily and easily detached, as the draft-chain when slack can be thrown or forced outward, carrying the hook with it, when it can be unhooked as easily as from the ordinary style of hook; and for replacing, the hook can be thrown outward and the ring or link of the chain inserted over it, when the weight of the chain and the direction of the draft will cause the hook to be drawn back under the horn.

In Fig. 3 I have shown a modification by which my improved hook may be adapted for use in place of the ordinary hook without materially changing or altering the harness. The forward upright member of the frame 2 in this case is omitted and a bolt or rivet, 15, inserted through suitable openings in the top and bottom portions of the frame. This bolt passes through the sleeve or ferrule 9 and supports the tug-strap or trace 5. Where an ordinary hook is attached to the harness and it is desired to replace it by my improvements, the hook is cut and removed and my hook is inserted by removing the bolt 15 and inserting it through the trace or tug-strap in the place from which the ordinary hook was taken. The bolt can be screwed or riveted to the other portion of the frame and the hook will be ready for use.

I claim as my invention—

1. As an article of manufacture, the tug-strap hook, as described, consisting of the frame, the hook 8, swiveling on said frame, and the horn 11 upon said frame projecting over the opening in the hook, substantially as described.

2. In a device of the class described, the combination of the frame 2, the hook 8, swiveling on said frame, the horn 11 upon said frame projecting over the opening in said hook, and the bolt 15, forming the front member of said frame, substantially as set forth.

In testimony whereof I have hereunto set my hand this 3d day of August, 1888.

EDWARD ELLIOTT.

In presence of—
  A. C. PAUL,
  C. L. NACHTRIEB.